(12) United States Patent
Dennison et al.

(10) Patent No.: US 11,359,946 B2
(45) Date of Patent: Jun. 14, 2022

(54) SENSING ELEMENT FOR A VORTEX FLOWMETER

(71) Applicant: CDI Meters, Inc., Woburn, MA (US)

(72) Inventors: Roger E. Dennison, Lexington, MA (US); Emily Schaefer, Beaverton, OR (US)

(73) Assignee: CDI Meters, Inc., Woburn, MA (US)

( * ) Notice: Subject to any disclaimer, the term of this patent is extended or adjusted under 35 U.S.C. 154(b) by 68 days.

(21) Appl. No.: 16/806,409

(22) Filed: Mar. 2, 2020

(65) Prior Publication Data

US 2020/0278224 A1    Sep. 3, 2020

Related U.S. Application Data

(60) Provisional application No. 62/813,077, filed on Mar. 3, 2019.

(51) Int. Cl.
*G01F 1/325*    (2022.01)
*G01F 15/18*    (2006.01)

(52) U.S. Cl.
CPC ............ *G01F 1/3259* (2022.01); *G01F 15/18* (2013.01)

(58) Field of Classification Search
CPC ........ G01F 1/32; G01F 1/3209; G01F 1/3218; G01F 1/3245; G01F 1/3254; G01F 15/18; G01F 1/325; G01F 1/3259
See application file for complete search history.

(56) References Cited

U.S. PATENT DOCUMENTS

| | | | | |
|---|---|---|---|---|
| 3,719,080 A | * | 3/1973 | Burgess | G01F 1/3236 73/861.34 |
| 4,475,405 A | * | 10/1984 | Corpron | G01F 1/3254 73/720 |
| 4,884,458 A | * | 12/1989 | Lew | G01F 1/32 73/861.24 |
| 2017/0108361 A1 | * | 4/2017 | Dennison | G01F 15/043 |

* cited by examiner

*Primary Examiner* — Erika J. Villaluna
(74) *Attorney, Agent, or Firm* — Brian M. Dingman; Dingman IP Law, PC

(57) ABSTRACT

A vortex flowmeter configured for ease of installation in a pipe, having a piezoelectric vortex-sensing element located within its shedder bar and mounted in a removable capsule.

12 Claims, 5 Drawing Sheets

SENSING ELEMENT FOR A VORTEX FLOWMETER

CROSS-REFERENCE TO RELATED APPLICATION

This application claims priority of Provisional Patent Application 62/813,077 filed on Mar. 3, 2019.

FIELD

A vortex flowmeter designed to facilitate installation in a pipeline and suitable for metering the flow of a gas, and in particular suitable for measuring the mass flow of compressed air that has not been through a dryer and consequently may contain droplets of water, oil and other residue.

BACKGROUND

Vortex flowmeters commonly sense the pressure variations associated with vortices by sensing the movement of, or forces exerted on, substantial metal objects placed in the flow stream. In some cases, the flexing of the shedder bar, which forms the vortices, is sensed; in other cases movement of or forces exerted on objects placed downstream of the shedder bar are sensed. Any externally-imposed vibration of the conduit on which the meter is mounted will cause vibration of the same objects, and for a given amplitude and frequency of vibration the forces involved will vary in proportion to the mass of the object being vibrated. The forces produced by the vortices, in a given configuration, will vary in proportion to the area exposed to the pressure fluctuations of interest. Consequently, the strength of the interfering vibration-related signal relative to the useful vortex-related signal will vary in proportion to the mass per unit area of the vortex-sensing element. Many means have been proposed to sense the effect of imposed vibrations on a vortex sensor and cancel out their effect on the vortex signal.

SUMMARY

The subject invention relates to a flowmeter that can be installed through a single, relatively small hole in the wall of a pipe. In an example the flowmeter senses flow by means of a piezoelectric film element that has very low mass per unit of sensing area and thus has minimal sensitivity to pipeline vibrations. In an example the flowmeter has the sensing element protected within the vortex bar. In an example the flowmeter is configured to minimize deposition of droplets and particulates on or near the sensing element. In an example the flowmeter has provision for transmitting pressure from within the pipe to a pressure sensor mounted outside. In an example the flowmeter has the vortex sensing element mounted in a capsule that is removable for cleaning and replacement.

All examples and features mentioned below can be combined in any technically possible way.

In one aspect, a vortex flowmeter includes a vortex-generating bar that is configured to be inserted into a pipe through a hole in a first wall of the pipe and span the pipe, and comprises a distal end that makes direct or indirect contact with a second pipe wall that is opposite the first wall of the pipe and a vortex-sensing piezoelectric element that is mounted within the bar and projects into an opening that crosses the bar perpendicular to the direction of flow.

Some examples include one of the above and/or below features, or any combination thereof. In an example the vortex flowmeter includes a capsule that contains the vortex-sensing element. In an example the capsule is removable. In an example the capsule is contained in a probe. In an example the capsule comprises an extension that fits snugly with a narrowed portion of the probe.

Some examples include one of the above and/or below features, or any combination thereof. In an example the vortex flowmeter also includes an anchoring structure for the vortex-generating bar and that is located outside of the pipe. In an example the anchoring structure is internally threaded. In an example the vortex-generating bar is threaded and is configured to engage the anchoring structure threads, to allow for adjustment of the depth of insertion of the vortex-generating bar in the pipe. In an example the vortex flowmeter further includes an o-ring seal between the vortex-generating bar and the anchoring structure, to inhibit leakage of fluid from the pipe. In an example the vortex flowmeter also includes an electronics enclosure carried by the anchoring structure. In an example the electronics enclosure comprises a base that is coupled to the anchoring structure and is separable from an upper portion. In an example the upper portion of the electronics enclosure is configured to be rotated along with the vortex-generating bar.

In another example a vortex flowmeter includes a vortex-generating bar that is configured to be inserted into a pipe through a hole in a first wall of the pipe and span the pipe, and comprises a distal end that makes direct or indirect contact with a second pipe wall that is opposite the first wall of the pipe, wherein the pipe contains a flowing fluid with an overall direction of flow, and wherein the vortex-generating bar comprises a transverse hole through the vortex-generating bar and a piezoelectric sensing vane in the transverse hole, an elastomeric member located between the distal end of the vortex-generating bar and the opposite wall of the pipe, to damp vibrations of the vortex-generating bar, an internally-threaded split ring located outside of the pipe and encircling the pipe, wherein the split ring is mechanically coupled to the vortex-generating bar and configured to hold the vortex-generating bar in the pipe, and further comprising an o-ring seal between the vortex-generating bar and the split ring, to inhibit leakage of fluid from the pipe, and a gasket between the split ring and the pipe. The vortex-generating bar is threaded and is configured to engage the split ring threads, to allow for adjustment of the depth of insertion of the vortex-generating bar in the pipe.

Some examples include one of the above and/or below features, or any combination thereof. In an example the vortex flowmeter also includes an electronics enclosure carried by the split ring. In an example the electronics enclosure comprises a base that is coupled to the split ring and is separable from an upper portion. In an example the upper portion of the electronics enclosure is configured to be rotated along with the vortex-generating bar. In an example the vortex flowmeter includes a probe in the vortex-generating bar and a removable capsule in the bar that contains the vortex-sensing element.

BRIEF DESCRIPTION OF THE DRAWINGS

Other objects, features and examples will occur to those skilled in the art from the following description and the accompanying drawings, in which.

DETAILED DESCRIPTION

This disclosure pertains to a vortex flowmeter requiring a single small hole in a pipe for installation. Aspects of a vortex flowmeter are disclosed in U.S. patent application Ser. No. 16/782,487, filed on Feb. 5, 2020, the entire disclosure of which is incorporated by reference herein for all purposes.

Figure 1:
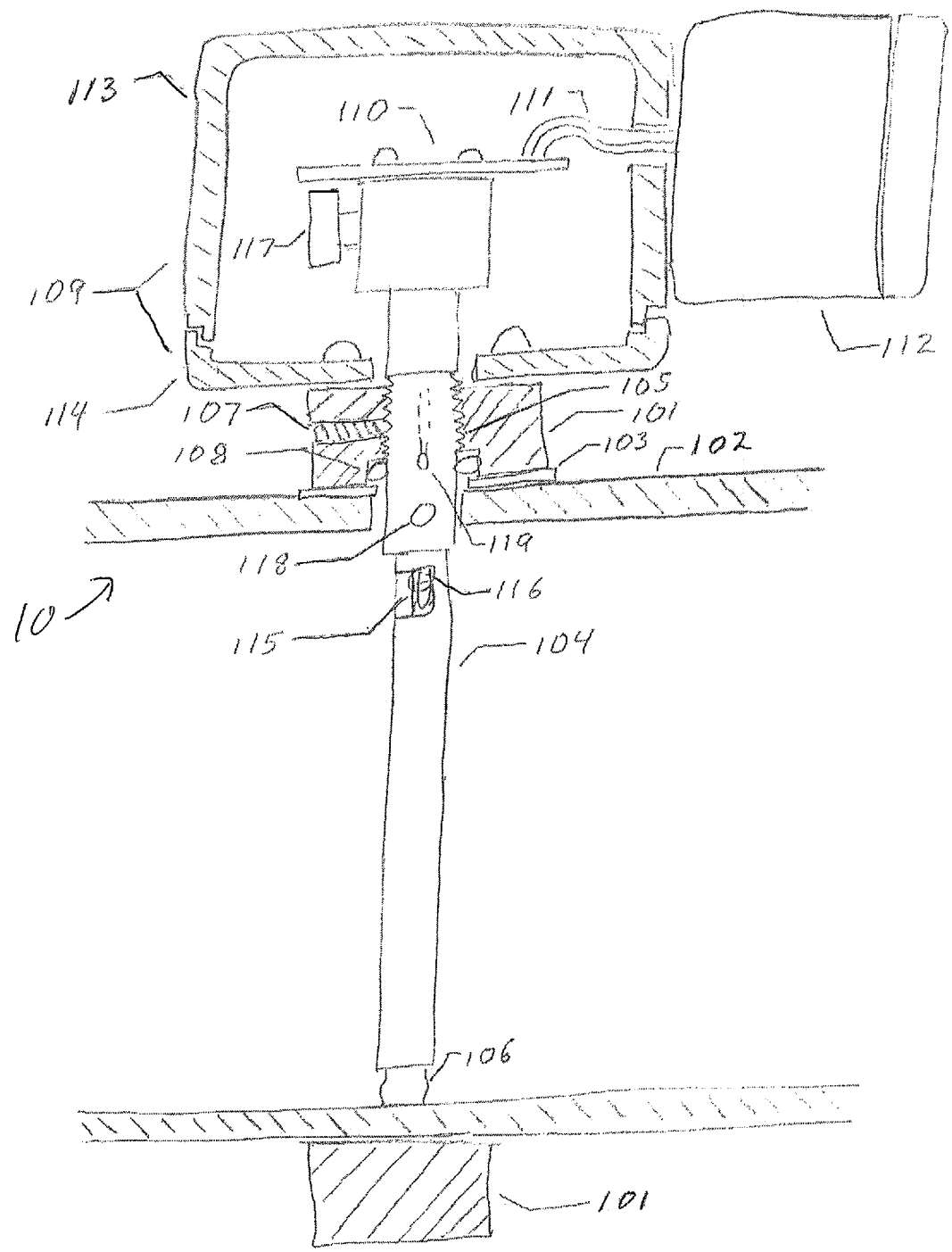
FIG. 1 is a partial sectional view showing components of an example of a vortex flowmeter mounted on a pipe.

FIG. 1 shows elements of a flowmeter 10 that are useful to understanding the present disclosure. A split ring, 101, mounts to pipe 102 and seals to it by means of gasket 103. A probe 104 is secured to the split ring by a thread 105 and extends across the pipe to the opposite wall. It terminates in an elastomeric piece, 106, which presses against the wall of the pipe, creating a mechanical connection through a material, such as Viton rubber, with vibration-dampening properties. The threaded connection allows the depth of insertion of the probe to be adjusted, compensating for limited variations in the dimensions of the pipe and ensuring that the elastomeric piece is properly compressed. Set screw 107 secures the probe in the proper orientation while o-ring 108 prevents leakage along the thread.

Enclosure 109 shields electronic circuit 110 from electromagnetic interference. Wires 111 provide signal and power connections to an outside circuit, not shown, in a second enclosure 112 that provides signal processing and display and connects to a source of power, not shown. To permit the probe to be turned in order to adjust its depth in the pipe, the upper portion of the enclosure, 113, can be separated from its base, 114. When the probe is rotated to adjust its position, the upper portion of the enclosure and the attached second enclosure, 112, can be rotated with it to prevent the attaching wires, 111, from becoming excessively twisted. The upper portion of the enclosure can also be rotated 180 degrees relative to its base to orient the display as desired. The upper portion of the enclosure and the base are attached by screws, not shown. Also visible in FIG. 1 are probe recess 115 and probe sensing vane, 116, used in sensing flow.

Fluid flow impinging on the probe creates vortices that are shed on either side of the probe, creating an oscillating differential pressure between the two sides of the probe. These pressure variations cause sensing vane 116 to flex, generating electrical signals that are amplified and filtered by electronic circuit 110 and transmitted to a microprocessor in enclosure 112 which determines their frequency. Volumetric flow is, to a good approximation, directly proportional to this frequency; the microprocessor may determine volumetric flow by multiplying the frequency by a constant determined during calibration, or it may interpolate in a lookup table generated during calibration to determine volumetric flow as a function of frequency.

Figure 2:
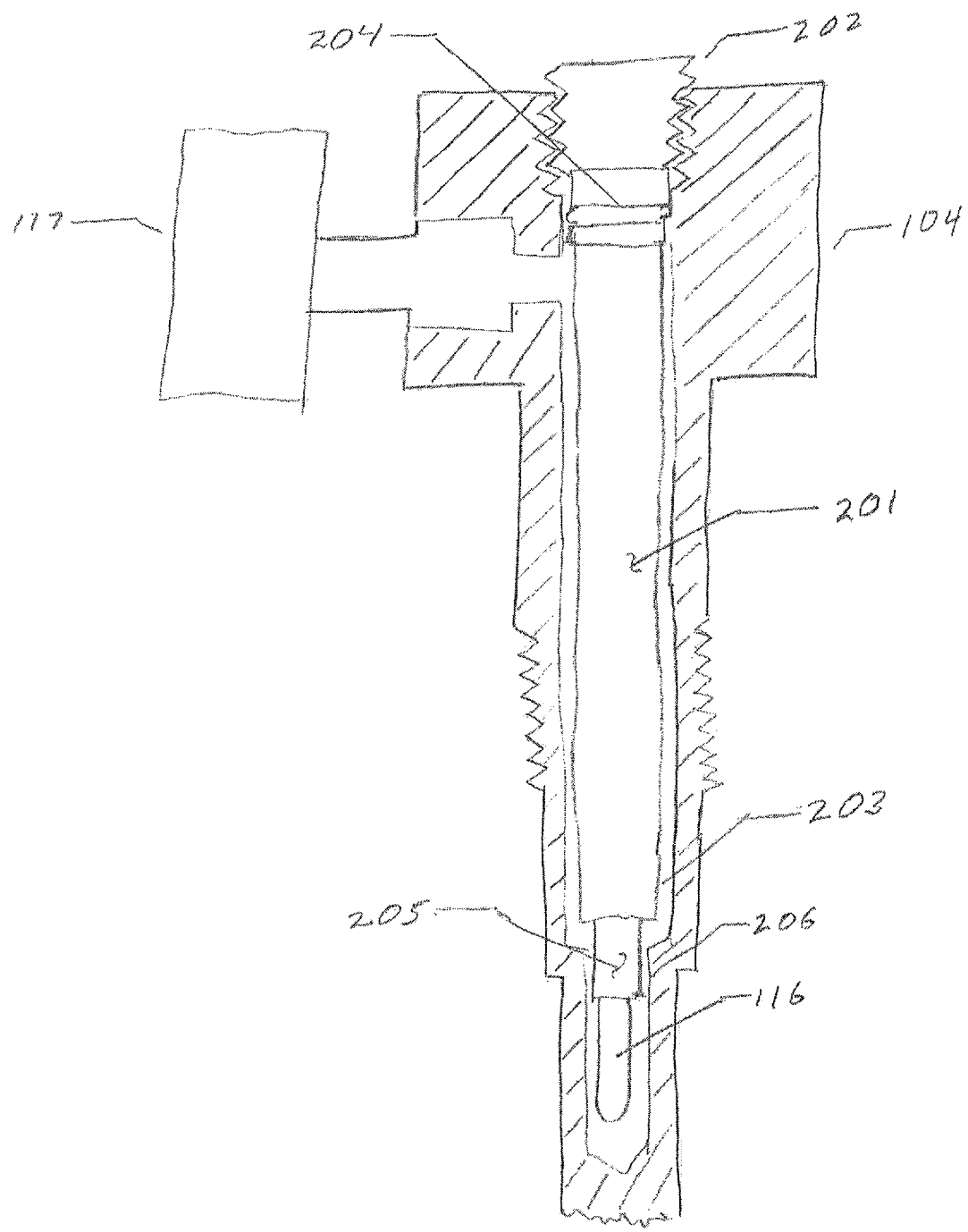
FIG. 2 is a partial sectional view of a probe for a vortex flowmeter, showing within it the vortex-sensing capsule assembly.

FIG. 2 is a sectional view of a portion of the probe 104, showing the enclosed replaceable sensing capsule 201 and attached pressure sensor 117. The capsule is secured within the probe by thread 202 and a set screw (not shown). An annular space 203 between the capsule and the surrounding probe permits fluid pressure to communicate from hole 118 (shown in FIG. 1) to pressure sensor 117. O-ring seal 204 prevents fluid from leaking through thread 202. Sensing vane 116 detects differential pressure across the probe. Extension 205 of the capsule fits snugly within a narrowed portion of the probe 206, ensuring that the capsule is properly aligned within the probe and the sensing element is properly located.

Figure 3:
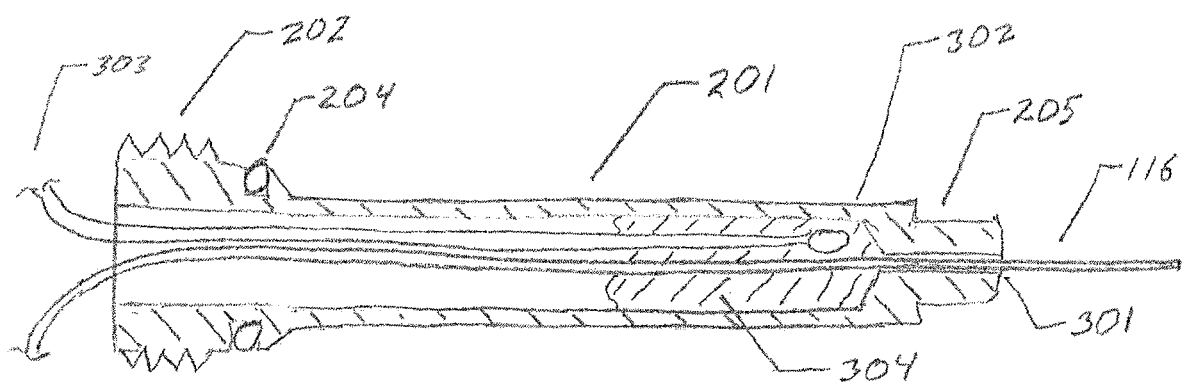
FIG. 3 is a sectional view of the capsule assembly of the probe of FIG. 2.

FIG. 3 is a sectional view of the capsule assembly, 201. Thread 202, o-ring seal 204 and extension 205 are visible in the figure. The capsule may be made of a corrosion-resistant metal such as stainless steel, or of a plastic with adequate strength and suitable for the environmental conditions the meter will encounter. Piezoelectric sensing element 116 projects out the front end of the capsule through slit 301. It extends the length of the capsule and out the back end, and is connected to circuit board 110 (not shown). Also within the probe and located near its front end is thermistor 302. Its leads 303 also extend out the back end of the capsule and connect to the circuit board. The front portion of the capsule, and optionally the entire capsule, is filled with epoxy 304 to provide a seal and to anchor the element and the thermistor in place.

Figure 4A:
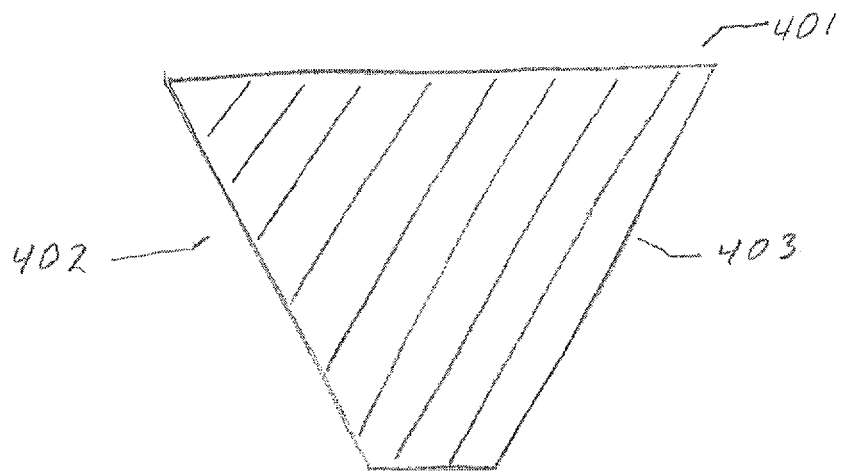
FIGS. 4A and 4B are two cross-sectional views of the portion of the probe that crosses the pipe, one showing the shape along the majority of its length and one showing the point at which the piezoelectric element senses differential pressure between the two sides of the probe.
Figure 4B:
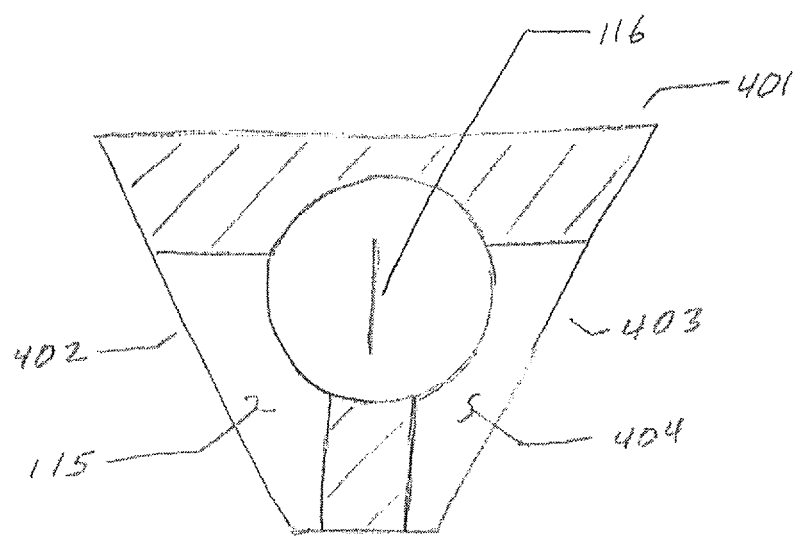

FIGS. 4A and 4B show two sectional views through probe 104, both in the portion of the probe that crosses the pipe and serves as a shedder bar, causing vortices to form as fluid passes. FIG. 4A is a section that applies over most of that portion of the probe, where the probe is solid. Face 401 faces into the flow; the approaching fluid alternately moves to the left and to the right across this face, creating alternating pressure differences between the two sloping sides of the probe, 402 and 403. FIG. 4B is a section at the point where the element 116 is exposed to the fluid. Cutouts 115 and 404 provide access for the fluid to the element while providing clearance so that debris will not be trapped near the element.

Figure 5:
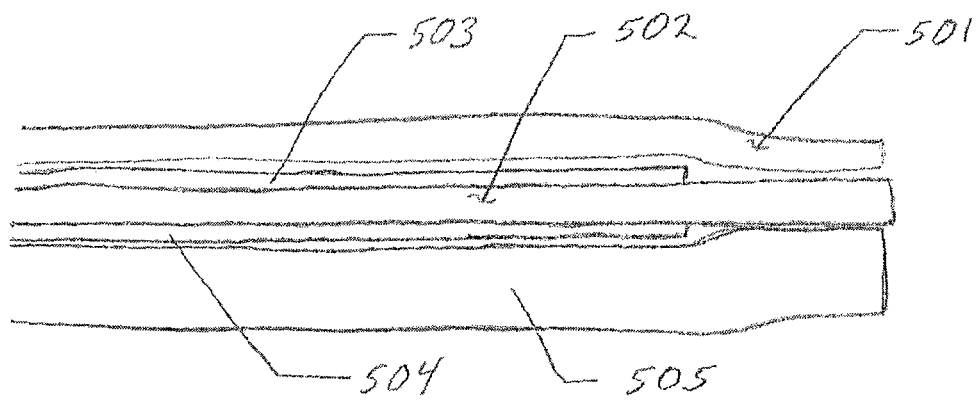
FIG. 5 is an enlarged view the construction of the piezoelectric sensing element of the probe.

FIG. 5 is a greatly enlarged sectional view through the sensing portion of the piezoelectric element 116. There is a top protective film, 501, of polyester (Mylar), PVDF, or some similar, moisture-resistant plastic. There is an inner layer, 502, of piezoelectric film, which generates an electrostatic potential between its faces when it is stretched or compressed in the direction of the length of the element. The two faces of this film are coated, in the active area of the sensor, with metallic layers 503, 504. These metallic layers extend, in the form of narrow, non-overlapping traces (not shown), to crimped contacts (also not shown) that connect to circuit board 110. Finally, there is a bottom protective layer, 505, of a material similar to that used in the top layer, 501. In order for the piezoelectric film to generate a varying voltage as the element is flexed, it is necessary that the film be stretched or compressed in the lengthwise direction as the element bends. For this to happen, the piezoelectric film must be away from the neutral axis of the element, when viewed as a cantilever beam. This is accomplished by making layers 505 and 501 different thicknesses. The three layers of the assembly are bonded together with an adhesive, not shown, such as cyanoacrylate or an acrylic pressure-sensitive adhesive. The edges may alternatively be bonded together by ultrasonic welding along the perimeter of the assembly.

Additional features permit the meter to determine mass flow of a known gas. Absolute pressure sensor 117, senses the pressure in the pipe while thermistor 119 senses the fluid temperature. Using well-known analog linearization circuitry, the thermistor produces a voltage signal which is converted to digital form by and analog to digital convertor in circuit 110 and then transmitted to the microcontroller in enclosure 112 for further linearization. The microcontroller divides the pressure by the absolute temperature and by the gas constant to obtain density, and multiplies density by volumetric flow to obtain mass flow.

A number of implementations have been described. Nevertheless, it will be understood that additional modifications may be made without departing from the scope of the inventive concepts described herein, and, accordingly, other examples are within the scope of the following claims.

What is claimed is:

1. A vortex flowmeter, comprising:
    a vortex-generating bar that is configured to be inserted into a pipe through a hole in a first wall of the pipe;
    a vortex-sensing low-mass piezoelectric element that is carried by the bar;
    an anchoring structure for the vortex-generating bar that is located outside of the pipe; and
    an electronics enclosure carried by the anchoring structure, wherein the electronics enclosure comprises a base that is coupled to the anchoring structure and is separable from an upper portion, and wherein the upper portion of the electronics enclosure is configured to be rotated along with the vortex-generating bar.

2. The vortex flowmeter of claim 1, further comprising a capsule that contains the vortex-sensing element.

3. The vortex flowmeter of claim 2, wherein the capsule is removable.

4. The vortex flowmeter of claim 2, wherein the capsule is contained in a probe.

5. The vortex flowmeter of claim 4, wherein the capsule comprises an extension that fits snugly with a narrowed portion of the probe.

6. The vortex flowmeter of claim 1, wherein the anchoring structure is internally threaded.

7. The vortex flowmeter of claim 6, wherein the vortex-generating bar is threaded and is configured to engage the anchoring structure threads, to allow for adjustment of the depth of insertion of the vortex-generating bar in the pipe.

8. The vortex flowmeter of claim 7, further comprising an o-ring seal between the vortex-generating bar and the anchoring structure, to inhibit leakage of fluid from the pipe.

9. The vortex flowmeter of claim 1, wherein the vortex-generating bar comprises a distal end that makes direct or indirect contact with a second pipe wall that is opposite the first wall of the pipe.

10. The vortex flowmeter of claim 1, wherein the vortex-sensing piezoelectric element projects into an opening that crosses the bar perpendicular to the direction of flow.

11. A vortex flowmeter comprising:
    a vortex-generating bar that is configured to be inserted into a pipe through a hole in a first wall of the pipe and span the pipe, and comprises a distal end that makes direct or indirect contact with a second pipe wall that is opposite the first wall of the pipe, wherein the pipe contains a flowing fluid with an overall direction of flow, and wherein the vortex-generating bar comprises a transverse hole through the vortex-generating bar and a piezoelectric sensing vane in the transverse hole;
    an elastomeric member located between the distal end of the vortex-generating bar and the opposite wall of the pipe, to damp vibrations of the vortex-generating bar;
    an internally-threaded split ring located outside of the pipe and encircling the pipe, wherein the split ring is mechanically coupled to the vortex-generating bar and configured to hold the vortex-generating bar in the pipe, and further comprising an o-ring seal between the vortex-generating bar and the split ring, to inhibit leakage of fluid from the pipe;
    a gasket between the split ring and the pipe;
    wherein the vortex-generating bar is threaded and is configured to engage the split ring threads, to allow for adjustment of the depth of insertion of the vortex-generating bar in the pipe; and
    an electronics enclosure carried by the split ring, wherein the electronics enclosure comprises a base that is coupled to the split ring and is separable from an upper portion, wherein the upper portion of the electronics enclosure is configured to be rotated along with the vortex-generating bar.

12. The vortex flowmeter of claim 11, further comprising a removable capsule in the vortex-generating bar that contains the vortex-sensing element.

\* \* \* \* \*